United States Patent
Molfetta et al.

(10) Patent No.: US 11,820,712 B2
(45) Date of Patent: Nov. 21, 2023

(54) ELECTRICALLY CONDUCTIVE BINDER FOR MANUFACTURING HEATABLE BUILDING PARTS

(71) Applicant: HConnect 2 GmbH, Heidelberg (DE)

(72) Inventors: Marcello Antonio Molfetta, Bergamo (IT); Marco Goisis, Bergamo (IT)

(73) Assignee: HCONNECT 2 GMBH, Heidelberg (DE)

( * ) Notice: Subject to any disclaimer, the term of this patent is extended or adjusted under 35 U.S.C. 154(b) by 478 days.

(21) Appl. No.: 17/113,693

(22) Filed: Dec. 7, 2020

(65) Prior Publication Data

US 2021/0188708 A1  Jun. 24, 2021

(30) Foreign Application Priority Data

Dec. 19, 2019 (EP) .................. 19217922.4

(51) Int. Cl.
| | | |
|---|---|---|
| *E04B 5/48* | (2006.01) | |
| *C04B 28/04* | (2006.01) | |
| *C04B 103/00* | (2006.01) | |
| *C04B 111/00* | (2006.01) | |
| *C04B 111/94* | (2006.01) | |

(52) U.S. Cl.
CPC .............. *C04B 28/04* (2013.01); *E04B 5/48* (2013.01); *C04B 2103/0079* (2013.01); *C04B 2111/00465* (2013.01); *C04B 2111/00612* (2013.01); *C04B 2111/94* (2013.01)

(58) Field of Classification Search
CPC ............ C04B 28/04; C04B 2103/0079; C04B 2111/00465; C04B 2111/00612; C04B 2111/94; C04B 2111/60; E04B 5/48; Y02W 30/91
See application file for complete search history.

(56) References Cited

U.S. PATENT DOCUMENTS

| | | | |
|---|---|---|---|
| 2018/0118620 A1* | 5/2018 | Morano Rodriguez | ..................... C04B 14/04 |
| 2019/0218144 A1 | 7/2019 | Pellenq et al. | |
| 2019/0352550 A1 | 11/2019 | Dee et al. | |
| 2020/0377415 A1* | 12/2020 | Nissinen | ................. C04B 14/28 |

FOREIGN PATENT DOCUMENTS

| | | |
|---|---|---|
| CN | 103130436 A | 6/2013 |
| CN | 106082837 A | 11/2016 |
| DE | 10049230 A1 | 4/2002 |
| EP | 1065451 A2 | 1/2001 |
| KR | 101654478 B1 | 9/2016 |
| KR | 101733191 B1 | 5/2017 |
| WO | 2018/111209 A1 | 6/2018 |
| WO | WO-2018111209 A1 * 6/2018 ............. C04B 28/04 |
| WO | 2019/215169 A1 | 11/2019 |

OTHER PUBLICATIONS

"Global breakthrough as Talga's graphene-infused concrete conducts electricity", ASX Release, http://www.talgaresources.com/irm/archive/asx-announcements.aspx?RID=8 a press release dated Jun. 25, 2018.
Ahmadreza Sedaghat et al: "Investigation of Physical Properties of Graphene-Cement Composite for Structural Applications", Open Journal of Composite Materials, vol. 04, No. 01, Jan. 1, 2014, pp. 12-21. (in English).
European Search Report dated Jul. 1, 2020 issued in the corresponding European Application 19217922.4 (in English).

* cited by examiner

*Primary Examiner* — Kumar R Bhushan
(74) *Attorney, Agent, or Firm* — Collard & Roe, P.C.

(57) ABSTRACT

Electrically conductive binder comprising a cement, a sterically stabilizing superplasticizer, a rheology modifier, graphite particles with carbon content higher than 60%, and graphene; cementitious mixture comprising the binder, and heatable building elements, preferably underfloor heating layers and/or heating panels and/or heating layers close to a wall, as well as floors with underfloor heating systems comprising a layer from the binder.

35 Claims, No Drawings

ELECTRICALLY CONDUCTIVE BINDER FOR MANUFACTURING HEATABLE BUILDING PARTS

CROSS-REFERENCE TO RELATED APPLICATION

This application claims priority under 35 USC 119 of European Application No. EP 19217922.4, filed on Dec. 19, 2019, the disclosure of which is herein incorporated by reference.

BACKGROUND OF THE INVENTION

The present invention relates to an electrically conductive binder, which can be used for manufacturing heatable building parts, especially electrically heated floors and parts for pavement or road surfaces, as well as floors comprising a layer from the hardened cementitious mixture.

A conventional cementitious part is a fairly good electrical insulator with resistivity values depending on composition, age, and environmental conditions. Typical resistivity is in the range from 10 to $10^4$ Ω·m. However, specific applications drive the need for electrically conductive properties in cementitious parts. A good conductivity is attractive for grounding, lightening protection, resistance heating (e.g in outdoor de-icing and indoor building heating), static charge dissipation, electromagnetic interference shielding, thermoelectric energy generation, overlays (electrical contacts) used in cathodic protection of steel reinforcing bars (rebars) in concrete and, last but not least for self-sensing concrete.

According to the state of the art cementitious mixtures with low resistivity are formulated with steel fibers, steel shavings, magnetite, carbon, graphite and carbonaceous aggregates. The low electrical resistivity of graphene induced several proposals for rendering concrete electrically conductive with it, e.g. CN 106082837 A and KR 101654478 B1. In CN 103130436 A oxidised graphene and graphene are used to provide a cement based composite material. On http://www.talgaresources.com/irm/archive/asx-announcements.aspx?RID=8 a press release dated Jun. 25, 2018 is listed which reports on electrically conductive concrete comprising a standard cement, graphene, graphite and silic-rich ore processing by-product. According to this document a resistivity of 0.05 Ω·cm is mentioned, but there are no details as to the specific components or their amounts. It is solely said that the result was attributed to small amounts of graphene combined with the silica rich ore by-product being conductive itself. KR 101733191 B1 describes a manufacturing method for a sidewalk block including a layer comprising graphite or graphene to improve thermal conduction. Adding graphite to concrete for improving thermal conductivity is also known from EP 1 065 451 A2 and DE 100 49 230 A1.

In most of the potential applications of electrically conductive concrete, such as heat generating concrete for indoor heating or outdoor snow/ice melting, an adequate voltage has to be applied to the casted building element to induce the intended temperature rise. It is well known that the difference of voltage applied between two points of a body causes electrons to flow and the intensity of the electrical current depends on the resistance of the body according to the Ohm's law. Thus, the higher the voltage the higher is the current through the body for a given resistance. It is also well-known that electric current is associated with danger as it can burn tissue, freeze muscles and fibrillate hearts. To guard against such an occurrence and to ensure an adequate level of safety to the users it is mandatory to avoid the flow of current that is dangerous for the human body in the surface which is in contact or can be touched by people. The threshold value which carries a low risk of dangerous electrical shock is classified by the International Electrotechnical Commission (IEC) as extra-low voltage (ELV). The IEC member organizations and the UK IET (BS 7671: 2008) define an ELV device or circuit as one in which the electrical potential between conductor or electrical conductor and earth (ground) does not exceed 50 V AC or 120 V DC (ripple free).

SUMMARY OF THE INVENTION

In view of the above problems the object of the present invention is to provide a cement-based binder having adequate low resistivity to permit the flow of current under extra-low voltage as described by the IEC while at the same time providing suitable workability and properties of the hardened material.

Surprisingly it has now been found that a binder comprising cement, a combination of graphite and graphene, a sterically stabilizing superplasticizer, and a rheology modifier, if necessary suitably formulated with additional admixtures and optionally with metal fibres, can be used to make cementitious parts with suitable resistivity e.g. for heated flooring or for pavement or road surfaces with de-icing ability while at the same time ensuring adequate workability of the paste made from it and mechanical properties of the resulting cementitious parts.

Thus, the invention solves the problems by providing an electrically conductive binder containing cement and a combination of graphite and graphene as well as a sterically stabilizing superplasticizer and a rheology modifier for applications such as indoor heating, outdoor snow/ice melting (e.g in driveways, bridges, highways, airport runways), water heating for swimming pools, and self-sensing concrete, whose performance is reached by applying a voltage lower than and up to extra-low voltage (50 V AC or 120 V DC).

Moreover the invention surprisingly also solves the drawbacks which are typically present with added carbon layered materials, such as ineffective dispersion, low strength, high shrinkage and bleeding, by adding a sterically stabilizing superplasticizer and a rheology modifier as well as optionally other specific admixtures.

DETAILED DESCRIPTION OF THE INVENTION

Herein, the term binder designates the dry composition of cement, graphite, graphene, sterically stabilizing superplasticizer and rheology modifier, optionally including further admixtures and/or additives such as metal fibers. Cementitious mixture (sometimes only mixture) means the binder mixed with water, wherein the mixture usually is a paste or suspension. The hardened cementitious mixture is designated cementitious part. Several binder components like graphite or graphene and admixtures can be added in the form of a paste, suspension or solution, in this case amounts given for the binder refer to the dry substance and the water is calculated as part of the mixing water.

In the binder according to the invention graphite and graphene are the electrically conducting components. According to the present invention graphite and graphene, summarizingly designated layered carbon materials, are uniformly dispersed in the binder, i.e. mixed with the cement. The layered carbon material does not form a conductive layer or wire itself but a conducting network within the cement matrix and the cementitious part manufactured from it. The invention does not need and preferably does not include conductive silica rich ore by-products.

Graphite is a naturally occurring form of crystalline carbon with its atoms arranged in a hexagonal structure. It occurs naturally in this form and is the most stable form of carbon under standard conditions. Graphite has low electrical resistivity of the order of $10^{-6}$ Ω·m at room temperature. Graphite has a layered, planar structure. The individual layers are called graphene. In each layer, the carbon atoms are arranged in a honeycomb lattice with separation of 0.142 nm, and the distance between planes is 0.335 nm.

The amount of graphite ranges from 19.5 to 60% by mass with respect to the binder, preferably from 25 to 50% by mass and most preferred from 30 to 40% by mass. Impure graphite with carbon content lower than 45% failed as well as exfoliated graphite with carbon content about 60%, therefore, graphite has more than 60% by mass carbon mass, preferably more than 80% by mass, most preferred more than 90% by mass. The preferred kind of graphite is natural flake graphite, preferably with carbon content higher than 90% by mass or 94% by mass. The moisture content is typically 0.5% by mass maximum. Suitable graphite is commercially available e.g. as Timrex M150 or Timrex M100 from Imerys Graphite & Carbon Switzerland Ltd, CH. Timrex M150 has the following average granulometric distribution by laser, Mastersizer (Malvern): $D_{10}=18$ μm, $D_{50}=71$ μm and $D_{90}=152$ μm, or according to the technical sheet which has a cumulative mass through sieve 150 mesh (106 μm) higher than 80%. Timrex M100 is characterized in the technical sheet by a cumulative mass through sieve 100 mesh (150 μm) higher than 80%.

Graphene is a single atomic plane of carbon atoms arranged in a hexagonal lattice, which—and this is essential—is sufficiently isolated from its environment to be considered free-standing. Graphene has an outstanding low value of resistivity of about $10^{-8}$ Ω·m at room temperature. Unfortunately, the term graphene is often used in a generic manner and not in a precise way to describe the many graphene-based materials known and this inconsistency in naming generates confusion. Herein, the term graphene shall cover single-layer graphene, graphenes having only a few layers such as 2-10 layers, graphene nanosheets, ultrafine graphite (i.e more than 10 graphene sheets but below 100 nm), graphene ribbons, and graphene dots, according to the classification proposed by P. Wick et al, Classification Framework for Graphene-Based Materials, Angewandte Chemie Int. Edition, Wiley-VCH Verlag, 2014, vol. 53 (n° 30), pp. 7714-7718. Graphene does not include graphene oxide or other functionalized graphene products. It is preferred to use graphite nanoplatelets paste (nanoplatelets) for safety reasons during handling. In one embodiment graphite nanoplatelets in the range from 10 to 100 layers are used. Typically, average flake thickness of the graphene is around 10 nm, and/or particle lateral size is in the range from 5 to 50 μm, and/or specific surface area is higher than 30 m²/g. Suitable graphite nanoplatelets is commercially available e.g. as G2Nan, both powder and paste form, from Nanesa S.r.L., IT. It is preferred to use graphene as such and not coated onto a carrier.

The amount of graphene, calculated as dry substance, ranges from 0.005 to 0.5% by mass with respect to the binder, preferably from 0.1 to 0.4% by mass and most preferred from 0.2 to 0.3% by mass. When graphene is used in paste form, e.g. a paste with 5% active matter in water, it is typically used in amounts ranging from 0.1 to 10% by mass paste relative to the mass of the dry binder, preferably from 2 to 8% by mass and most preferred from 4 to 6% by mass.

Typically the mass ratio of graphene to graphite ranges from 0.001 to 0.02, preferably from 0.002 to 0.015 and most preferred from 0.005 to 0.01. The aforesaid ratios allow to balance the high price of graphene with a cost-effective recipe still achieving the desired conductivity levels.

The cement used can be any known cement. In the context of the present invention cement means a finely ground material able to harden after mixing with water by hydraulic reactions. Preferred cements are Portland cement (OPC) and Portland composite cements, such as the cements defined by the standards EN 197 or ASTM C150. However, other cements are possible, like geopolymer cement, super sulphated cement, calcium aluminate cement, calcium sulfoaluminate cement (optionally also containing one or more of belite, ferrite, ternesite), and belite based cements made by other methods than sintering in a rotary kiln like hydrothermal treatment and tempering.

In view of the decrease in strength caused by the added layered carbon material it is usually preferred to use a cement developing high strength on its own, so that sufficient strength is maintained inspite of the dilution. Thus, in one embodiment a CEM I 52.5, preferably with a BET specific area of 1.1 to 2.5 m²/g, is preferred as the cement. However, depending on use it is also possible to employ composite cements. These are preferred for being more environmentally friendly, i.e. needing less energy and finite raw materials.

The amount of cement with respect to the binder ranges from 40 to 80% by mass, preferably from 45 to 70% by mass, and most preferred from 50 to 65% by mass. The optimum amount also depends on the used kind of cement, a cement with less strength potential needs to be present in higher amounts to reach the same strength of the building element.

The incorporation of graphite and graphene in the cementitious mixture negatively affects different features of the mixture such as increasing water demand, lowering strength, increasing shrinkage and producing bleeding after the casting of the mixture. It was surprisingly found that a sterically stabilizing superplasticizer combined with a rheology modifier, preferably in a combination with further selected admixtures, namely an expansive mineral agent and/or an defoamer, added to the composition are able to tackle these drawbacks. Thus, the binder according to the present invention or its mixture with water comprises a sterically stabilizing superplasticizer and a rheology modifier, and preferably also an expansive mineral agent and/or an defoamer. A cementitious mixture from this binder possesses characteristics not only of low resistivity and hence good electrical conductivity but also of adequate mechanical properties of the building parts made with it, reduced shrinkage and absence of bleeding.

The superplasticizer included according to the invention is a sterically stabilizing superplasticizer. It is preferably a comb-polymer with hydrophilic side chains such as an polycarboxylate-ether based copolymer (PCE) or mixtures thereof. Usually, the amount (dry matter) is from 0.2 to 2% by mass relative to the mass of cement, preferably from 0.5 to 1.0% by mass. Other superplasticizers that have an effect based on electrostatic repulsion like sulfonated naphthalene formaldehyde condensate, sulfonated melamine formaldehyde condensate, and sulphonated-acetone formaldehyde condensate are not suitable.

The rheology modifier is preferably selected from the group consisting of a cellulose or a functionalized cellulose with molecular mass ranging from 20 to 20000 Da, polyethylenglycol, diethyleneglycol, gum arabic, polyvinylalcohol/acetate, polyvinylpyrrolidone, colloidal silica, polyacrylamide, latex and mixtures thereof. Usually, the amount is from 0.01 to 0.9% by mass relative to the mass of cement, preferably from 0.03 to 0.6% by mass.

The expansive mineral agent is preferably calcium oxide, or sulpho-aluminate compound, or calcium sulphate, or mixtures thereof. Usually, the amount is from 0.5 to 9% by mass relative to the mass of cement, preferably from 3 to 7% by mass.

The defoamer is preferably tributylphosphate, polyacrylate, modified siloxane, polyethersiloxane or mixtures thereof. Usually, the amount is from 0.02 to 0.30% by mass relative to the mass of cement, preferably from 0.05-0.20% by mass.

In one preferred embodiment expansive mineral agent and defoamer are contained in the binder or cementitious mixture. It is also possible to combine two, three or all of the sterically stabilizing superplasticizer, rheology modifier, expansive mineral agent and defoamer into one admixture package in order to simplify the addition of the constituents.

To the binder and/or the cementitious mixture made from it other known admixtures and/or additives can be added. Typically, admixtures such as (super)plasticizers, water reducing agents, retardants, accelerators, etc., as well as additives like metal fibers, fillers, silica fume, pigments, polymers, etc. can be added in their usual amounts.

One preferred further component of the binder or cementitious mixture are steel fibers with different shapes, preferably having an aspect ratio between 50 and 80, which enables a further increase of conductivity. Preferred fibers are inox straight type with e.g. 12.5 mm length and 0.2 mm diameter (available from e.g. KrampeHarex GmbH & Co. KG, DE). Useful amounts of metal fibers range from 1 to 15% by mass, preferably from 2 to 12% by mass, and most preferred from 4 to 8% by mass, with respect to the binder.

A cementitious mixture made from the binder according to the invention by at least adding water typically has the following properties:
  spread measured according to UNI 7044 from 180 to 230 mm, preferably from 190 to 220 mm, and
  density measured according to UNI EN 1015-4 from 1600 to 1800 kg/m$^3$, preferably from 1630 to 1750 kg/m$^3$.

The 28 days hardened specimens of the cementitious mixture made from the binder usually show:
  a compressive strength measured according to UNI EN 196-1 from 10 to 20 MPa, preferably from 13 to 17 MPa,
  a flexural strength measured according to UNI EN 196-1 from 2.5 to 8 MPa, preferably from 3 to 6 MPa,
  a dry shrinkage measured according to UNI 6687 (modified by using specimens of 1 cm thickness) from 1200 to 3000 μm/mm, preferably from 1600 to 2500 μm/mm,
  an electrical resistance measured as described in the examples from 5 to 100Ω, preferably from 20 to 60Ω, and
  a resistivity calculated from the resistance ranging from 0.1 to 0.5 Ω·m, preferably from 0.2 to 0.3 Ω·m.

For manufacturing the binder cement (powder), graphite (powder), graphene (either paste or in dry form), sterically stabilizing superplasticizer (if dry material is used), rheology modifier (if dry material is used) and if applicable further admixtures (powders) are mixed in a suitable device ensuring thorough mixing (step 1). Then, the water, liquid admixtures (if any) and optionally additives (e.g. fibers) are added (step 2). Alternatively, all or some admixtures and/or additives can be added before, while or after water has been added. Admixtures or additives which are usually provided as solution or suspension are preferably added with the water. It is preferred to adapt mixing time and energy so that the layered carbon material is properly dispersed in the binder or mixture. This is facilitated by thorough mixing of the binder, for example using high energy mixing devices and/or adjusting mixing speed and/or mixing time. Useful mixing devices are mixers with vertical or horizontal axes, both forced or plain machine. Suitable is e.g. stirring by a low-speed mechanical mixer or by a mortar mixer (e.g Hobart type). It is ensured that no powder remains stuck to the sides or the bottom of the container and the mix is homogenous and lump-free.

The cementitious mixture is made from the binder (dry) according to the invention by adding water and optionally (further) admixtures and/or (further) additives. Usually, the ratio of water to solids ranges from 0.48 to 0.65, preferably from 0.50 to 0.60. It can be higher for higher amounts of cement or lower strength needed. The ratio of water to cement typically ranges from 0.6 to 1.5, preferably from 0.8 to 1.1.

The properties of the cementitious mixture are adjusted in a way known as such to match the intended use. For example, floor screed needs to have a high flowability, often is desired to be self-levelling. Therefore, higher amounts of water are useful when the associated lower strength is not a problem. Pavement tiles or precast road surface parts need higher or high strength, respectively, and should also allow demoulding as soon as possible. Therefore, lower water amounts are used, if needed enabled by adding (further) (super)plasticizers and/or water reducing agents.

In one embodiment, the cement and layered carbon materials are mixed with water and after that the further components like admixtures and additives etc. are added. In another embodiment the powders of the binder are mixed and stored either in bulk or packaged in sacks, bags, containers or the like for delivery upon demand. The binder and cementitious mixture are especially useful for manufacturing building elements that are electrically heatable with extra-low voltage. Preferred composition ranges expressed in % by mass of the dry binder, or in % by mass relative to the cement when so indicated, for all the constituents, are as follows:
  cement 40-80%, preferably 45-70%, most preferred 50-65%;
  graphite 19.5-60%, preferably 25-50%, most preferred 30-40%;
  graphene 0.005-0.5%, preferably 0.1-0.4%, most preferred 0.2-0.3%;
  steel fibers 2-15%, preferably 4-8%;
  sterically stabilizing superplasticizer (dry matter) 0.2-2%, preferably 0.5-1 relative to the cement;
  rheology modifier 0.01-0.9%, preferably 0.03-0.6% relative to the cement;
  expansive mineral agent 0.5-9%, preferably 3-7% relative to the cement;
  defoamer 0.02-0.3%, preferably 0.05-0.2% relative to the cement,
wherein the sum of all components present in a mixture is 100%, taking into account all components present. The water/cement ratio typically ranges from 0.8 to 1.5 and/or the water solids ratio preferably ranges from 0.48 to 0.65, more preferred from 0.5 to 0.6.

For subbase making a storage of the binder in bulk and delivery of the cementitious mixture as ready mix concrete can be preferred. The mixture can also be cast into a mould to form a building element or cast into formwork or cast onto the support layer to form the floor.

Floors with underfloor heating are one especially preferred use of the binder according to the invention. To this end the binder is provided as dry mix for floor screed or combined with the necessary further components during mixing with water. Preferably, only a thin, uppermost layer of the floor structure beneath the final floor (ceramic tiles, carpet, parquet, laminate flooring, etc.) is provided from the binder. The floor usually comprises a basic support layer, a layer of thermal insulation material, a layer of concrete for floor undercoat, the electrically conductive layer with connection to an extra-low voltage AC or DC source and an uppermost layer from e.g. ceramic tiles, carpet, parquet, or laminate flooring. The uppermost layer can be adhered to the electrically conductive layer by a suitable adhesive, which is compatible with the heating and adapted to the uppermost layer, e.g. a cement based glue for adhering ceramic tiles. The floor, either all layers or some and specifically the electrically conductive layer, can be cast in one or several parts or assembled from pre-cast and prefabricated slabs. Typical thicknesses are:
- basic support layer: 5 to 15 cm, depending on the structural uses;
- a layer of thermal insulating material: 5 to 20 cm depending on the climate/placing environment;
- a layer of concrete for floor undercoat: 5 to 15 cm depending on the structural uses
- a layer of electrically conductive concrete: 0.3 to 2 cm, preferably 0.3 to 1 cm.

Another possible use is as de-icing part of pavements when it is a laying course. For these uses it is also preferred to make only a thin layer of the cementitious mixture from the binder. This thin layer is placed closely beneath the upper surface that is the paver.

The invention specifically covers the following embodiments:
1. Electrically conductive binder comprising a cement, graphite particles with a carbon content higher than 60%, and graphene, wherein the amount of cement ranges from 40 to 80% by mass of the binder, the amount of graphite ranges from 19.5 to 60% by mass of the binder, the amount of graphene as dry matter ranges from 0.005 to 0.5% by mass of the binder and the binder contains a sterically stabilizing superplasticizer in an amount (dry matter) from 0.2 to 2.0% by mass relative to the mass of the cement, and a rheology modifier in an amount (dry matter) from 0.01 to 0.9% by mass relative to the mass of the cement.
2. Binder according to embodiment 1 comprising 45 to 70% by mass cement, preferably 50 to 65% by mass with respect to the total binder mass.
3. Binder according to embodiment 1 or 2, wherein the amount of graphite ranges from 25 to 50% by mass with respect to the binder, preferably from 30 to 40% by mass.
4. Binder according to embodiment 1 or 2, wherein the amount of graphene, calculated as dry substance, ranges from 0.1 to 0.4% by mass with respect to the binder, preferably from 0.2 to 0.3% by mass.
5. Binder according to one of embodiments 1 to 4, wherein the amount (dry matter) of the sterically stabilizing superplasticizer ranges from 0.5 to 1% by mass relative to the mass of cement and/or the amount (dry matter) of rheology modifier ranges from 0.03 to 0.6% by mass relative to the mass of cement.
6. Binder according to one of embodiments 1 to 5, wherein the cement is CEM I 52.5R with BET specific area of 1.1 to 2.5 $m^2/g$.
7. Binder according to one of embodiments 1 to 6, wherein the graphite has more than 80% by mass carbon, preferably more than 90% by mass, most preferred more than 94% by mass, and/or is natural flake graphite with cumulative mass through sieve 150 mesh or 100 mesh higher than 80%.
8. Binder according to one of embodiments 1 to 7, wherein the graphene is graphite nanoplatelets with flake thickness around 10 nm and specific surface area higher than 30 $m^2/g$.
9. Binder according to one of embodiments 1 to 8, additionally containing an expansive mineral agent and/or a defoamer.
10. Binder according to embodiment 9, containing relative to the mass of cement:
    0.5 to 9% by mass of expansive mineral agent, and/or
    0.02 to 0.30% by mass of defoamer.
11. Binder according to one of embodiments 1 to 10, additionally containing metal fibers, preferably steel fibers, preferably having an aspect ratio between 50 and 80, most preferred inox straight type fibers with 12.5 mm length and 0.2 mm diameter, preferably in an amount from 2 to 12% by mass relative to the mass of binder, more preferred in an amount from 4 to 8% by mass.
12. Binder according to one of embodiments 1 to 11, additionally containing additional constituents, preferably pigments, polymers, fillers, and/or silica fume.
13. Cementitious mixture comprising the binder according to one of embodiments 1 to 12 and water, wherein the water/cement ratio ranges from 0.8 to 1.5 and/or the water/solids ratio ranges from 0.48 to 0.65, preferably from 0.5 to 0.6.
14. Cementitious mixture according to embodiment 13, wherein the cementitious mixture or the cementitious part made from it has one or more of the following properties:
    spread measured according to UNI 7044 from 170 to 230 mm, preferably from 180 to 220 mm;
    density measured according to UNI EN 1015-4 from 1600 to 1800 $kg/m^3$, preferably from 1630 to 1750 $kg/m^3$;
    and/or a 28 days hardened cementitious part from the cementitious mixture has one or more of the following properties:
    a compressive strength measured according to UNI EN 196-1 from 10 to 20 MPa, preferably from 13 to 17 MPa;
    a flexural strength measured according to UNI EN 196-1 from 2.5 to 8 MPa, preferably from 3 to 6 MPa,
    a dry shrinkage measured according to UNI 6687 (modified by using specimens of 1 cm thickness) from 1200 to 3000 μm/mm, preferably from 1600 to 2500 μm/mm,
    an electrical resistance measured as described in the examples from 5 to 100Ω, preferably from 20 to 60Ω;

an electrical resistivity calculated from the resistance ranging from 0.1 to 0.5 Ω·m, preferably from 0.2 to 0.3 Ω·m.

15. Use of a binder according to one of embodiments 1 to 14 for manufacturing electrically heatable building elements, preferably underfloor heating layers and/or heating panels and/or heating layers close to a wall.

16. Floor with underfloor heating system, wherein the floor comprises:
    a basic support layer,
    a layer of thermal insulating material,
    a layer of concrete for floor undercoat,
    a layer made from an electrically conductive binder according to one of embodiments 1 to 14 with electrical connection to an extra-low voltage AC or DC source,
    an uppermost layer from ceramic or marble tiles, parquet, carpet, or laminate flooring.

17. Floor according to embodiment 16, wherein the floor is assembled from precast and prefabricated slabs.

The invention will be illustrated further with reference to the examples that follow, without restricting the scope to the specific embodiments described. The invention includes all combinations of described and especially of preferred features that do not exclude each other.

If not otherwise specified any amount in % or parts is by mass and in the case of doubt referring to the total mass of the composition/mixture concerned. A characterization as "approximately", "around" and similar expression in relation to a numerical value means that up to 10% higher and lower values are included, preferably up to 5% higher and lower values, and in any case at least up to 1 higher and lower values, the exact value being the most preferred value or limit. The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 mass percent of such material.

Example 1

A mixture was made with the following composition (all constituents are expressed in % by mass relative to the mass of binder (or cement if so stated)):
- 59.94% by mass CEM I 52.5R Portland cement in powder form;
- 36.71% by mass graphite Timrex M150 (IMERYS) in powder form; and
- 0.26% by mass of dry graphite nanoplatelets G2Nan (NANESA) added as paste. Cement, graphite and graphene paste were mixed for 1 min. at slow rate (140±5 min$^{-1}$) in a Hobart planetary mixer to get a good dispersion of the layered carbon materials into the cementitious matrix. To this mixture were added:
- 0.45% by dry mass (0.76% by mass relative to the mass of cement) sterically stabilizing superplasticizer (polycarboxylate-ether copolymer with hydrophilic side chains, PCE) added as solution;
- 0.03% by mass (0.05% by mass relative to the mass of cement) rheology modifier (functionalized cellulose) in powder form;
- 2.55% by dry mass (4.25% by mass relative to the mass of cement) expansive agent (overcooked calcium oxide) in powder form;
- 0.06% by mass (0.1% by mass relative to the mass of cement) defoamer (based on fatty alcohol alcoxylated and polysiloxanes) in powder form, and water to obtain a ratio of total water to cement of 0.94. Water and admixtures were added one after the other, starting from the admixtures in powder form, then water, and at the end the admixtures in liquid form into the bowl and the cementitious mixture was mixed for 5 minutes at the slow rate of the used Hobart-type mixer.

The density and spread of the fresh mixture obtained were determined. Standard samples were cast to determine the mechanical properties. Another part of the mixture was cast into a tile-like mould of 23.5 cm×13.5 cm×0.9 cm, into which two strips of copper were placed crosswise and close to the two short sides of the mould with the ends free to protrude for the resistance measurement and to connect to the extra-low voltage current.

Dry shrinkage was measured according to UNI 6687 modified by using samples with 1 cm thickness.

Resistance R was measured by a multimeter connected to the two copper strips embedded in the composite along the length of the tile.

Resistivity ρ was computed by Ohm's law, ρ=R·surface/length, from the measured resistance R, where surface refers to the tile area and length to the distance between the two strips.

The measured properties of the cementitious mixture and the hardened cementitious parts are listed in table 1.

TABLE 1

| | | | |
|---|---|---|---|
| Fresh state | Spread diameter (UNI 7044) | mm | 200 |
| | Fresh density (UNI EN 1015-4) | Kg/m$^3$ | 1650 |
| Hardened | Compressive Strength@28d (UNI EN 196-1) | MPa | 15.3 |
| | Flexural Strength@28d UNI EN 196-1) | MPa | 4.2 |
| | Dry shrinkage@28 d (UNI 6687 modified) | μm/m | −2400 |
| | Elect. Resistance@28d | Ω | 45 |
| | Resistivity@28d | Ω · m | 0.23 |

Comparative Examples 1A to 1F

Binders and cementitious mixtures were made as described in example 1, however, with an electrostatic repulsion stabilizing superplasticizer (sulphonated melamine formaldehyde condensate, SMF) instead of the sterically stabilizing PCE superplasticizer (examples 1A and 1B), limestone filler instead of rheology modifier (example 1A and 1C) or with other amounts of cement (1D and 1E), graphite (1D) or graphene (1F) as shown in the following table 1a. As can be seen from the notes in table 1a, each of these comparative cementitious mixtures was not useful due to either too high electrical resistance, insufficient workability or crack formation of the cementitious part.

TABLE 1a

| Component | Example 1 | Comparative example 1A | Comparative example 1B | Comparative example 1C | Comparative example 1D | Comparative example 1E | Comparative example 1F |
|---|---|---|---|---|---|---|---|
| Cem 52, 5R I | 59.94 | 59.94 | 59.94 | 59.94 | 79.65 | 36 | 60.32 |
| Graphite M150 | 36.71 | 36.71 | 36.71 | 36.71 | 17 | 60.65 | 36.04 |
| Graphene G2Nan (*) | 0.26 | 0.26 | 0.26 | 0.26 | 0.26 | 0.26 | 0.55 |
| PCE superplasticizer (**) | .0.45 | 0 | 0 | 0.45 | 0.45 | 0.45 | 0.45 |
| SMF superplasticizer (**) | 0 | .0.45 | 0.45 | 0 | 0 | 0 | 0 |
| rheology modifier | 0.03 | 0 | 0.03 | 0 | 0.03 | 0.03 | 0.03 |
| Limestone filler | 0 | 0.03 | 0 | 0.03 | 0 | 0 | 0 |
| Defoamer | 0.06 | 0.06 | 0.06 | 0.06 | 0.06 | 0.06 | 0.06 |
| expansive mineral agent | 2.55 | 2.55 | 2.55 | 2.55 | 2.55 | 2.55 | 2.55 |
| Total | 100 | 100 | 100 | 100 | 100 | 100 | 100 |
| W/C | 0.94 | 0.94 | 0.94 | 0.94 | 0.94 | 0.94 | 0.94 |
| Notes |  | Specimen loses water Resistance > 1 KΩ | Specimen loses water Resistance > 1 KΩ | Specimen loses water Resistance 50 Ω | Tile shows a crack Resistance meaningless | Sticky fresh mixture, not workable Resistance meaningless | Tile shows a crack Resistance 370 Ω |

(*) added as paste
(**) added as solution

Example 2

A mixture was made with the following composition (all constituents are expressed in % by mass of the binder (or cement if so stated)):

- 55.96% by mass CEM I 52.5 R Portland cement in powder form;
- 34.28% by mass graphite TIMREX M150/M100 (IMERYS) in powder form;
- 0.24% by mass of dry graphite nanoplatelets G2 Nan (Nanesa) in paste form Cement, graphite and graphene paste were mixed for 1 minute at slow rate (140±5 min$^{-1}$) in a Hobart planetary mixer to get a good dispersion of the components into the cementitious matrix. To this dry mix were added:
- 0.47% by mass (0.85% by mass relative to the mass of cement) sterically stabilizing superplasticizer (polycarboxylate-ether copolymer with hydrophilic side chains) in liquid form;
- 0.21% by mass (0.37% by mass relative to the mass of cement) rheology modifier (UCS Pack, Sika) in powder form;
- 2.38% by mass (4.25% by mass relative to the mass of cement) expansive agent (overcooked calcium oxide) in powder form;
- 0.06% by mass (0.1% by mass relative to the mass of cement) defoamer (based on fatty alcohol alcoxylated and polysiloxanes) in powder form, and water to obtain a ratio of total water to cement of 0.94. Water and admixtures were added into the bowl and mixed with the mixture for 5 minutes at slow rate. Then, 6.40% by mass of steel fibers DG 12.5/0.20 (KRAMPEHAREX) were added without stopping the mixer and the cementitious mixture mixed for another three minutes. The properties were determined as described in example 1 and the determined properties are shown in Table 2.

TABLE 2

| Fresh state | Spread diameter (UNI 7044) | mm | 190 |
|---|---|---|---|
|  | Fresh density (UNI EN 1015-4) | Kg/m$^3$ | 1702 |
| Hardened state | Compressive Strength@28d (UNI EN 196-1) | MPa | 14.4 |
|  | Flexural Strength@28d (UNI EN 196-1) | MPa | 5.4 |
|  | Dry shrinkage@28d (UNI 6687 modified) | μm/m | −1790 |
|  | Elect. Resistance@28d | Ω | 55 |
|  | Resistivity@28d | Ω*m | 0.24 |

Comparative Examples 2G-2K

Binders and cementitious mixtures were made as described in example 2, however, with an electrostatic repulsion stabilizing SMF superplasticizer instead of the sterically stabilizing PCE superplasticizer (examples 2G and 2H), limestone filler instead of rheology modifier (examples 2G and 2I), limestone filler instead of steel fibers (2J) or with other amounts of graphite and graphene (2K) as shown in the following table 2a. As can be seen from the notes in table 2a, each of these comparative cementitious mixtures was not useful due to either too high electrical resistance or insufficient workability of the cementitious mixture.

TABLE 2a

| Components | Example 2 | Comparative example 2G | Comparative example 2H | Comparative example 2I | Comparative example 2J | Comparative example 2K |
|---|---|---|---|---|---|---|
| CEM 52, 5R I | 55.96 | 55.96 | 55.96 | 55.96 | 55.96 | 55.96 |
| Graphite M150 | 34.28 | 34.28 | 34.28 | 34.28 | 34.28 | 34.48 |
| Graphene G2Nan (*) | 0.24 | 0.24 | 0.24 | 0.24 | 0.24 | 0.04 |
| Inox steel fiber | 6.40 | 6.40 | 6.40 | 6.40 | 0 | 6.40 |
| PCE superplasticizer (**) | 0.47 | 0 | 0 | 0.47 | 0.47 | 0.47 |
| SMF superplasticizer (**) | 0 | 0.47 | 0.47 | 0 | 0 | 0 |
| rheology modifier | 0.21 | 0 | 0.21 | 0 | 0.21 | 0.21 |

TABLE 2a-continued

| Components | Example 2 | Comparative example 2G | Comparative example 2H | Comparative example 2I | Comparative example 2J | Comparative example 2K |
|---|---|---|---|---|---|---|
| Defoamer | 0.06 | 0.06 | 0.06 | 0.06 | 0.06 | 0.06 |
| expansive mineral agent | 2.38 | 2.38 | 2.38 | 2.38 | 2.38 | 2.38 |
| Limestone filler | 0 | 0.21 | 0 | 0.21 | 6.40 | 0 |
| Total | 100 | 100 | 100 | 100 | 100 | 100 |
| W/C | 0.94 | 0.94 | 0.94 | 0.94 | 0.94 | 0.94 |
| Notes | | Specimen loses water | | Specimen loses water | | |
| | | Resistance 500 Ω | Resistance 590 Ω | Resistance 158 Ω | Resistance 172 Ω | Resistance 210 Ω |

(*) added as paste
(**) added as solution

Example 3

A thin layer of electrically conductive cementitious mixture of example 1, dimensions 23.5 cm×13.5 cm×0.9 cm, was cast onto a 3 cm thick concrete slab of the same dimensions. A 24 V extra-low voltage was applied to the two copper electrodes embedded during casting of the fresh material in the layer of the conductive cementitious mixture. Tests with both DC and AC were carried out. Table 3 shows the increase of the surface temperature over time, under DC and AC current.

TABLE 3

| | Time (min) | | | | | |
|---|---|---|---|---|---|---|
| | 0 | 10 | 20 | 30 | 40 | 50 |
| 24 V DC Sample resistance: 25.9 Ω Indoor temperature: 22.0 | | | | | | |
| Temperature (° C.) | 22.0 | 25.8 | 27.2 | 28.7 | 30.1 | 31.0 |
| 24 V AC Sample resistance: 25.9 Ω Indoor temperature: 21.7 | | | | | | |
| Temperature (° C.) | 21.7 | 29.6 | 34.5 | 36.4 | 38.3 | 39.8 |

Example 4

Example 3 was repeated with the electrically conductive cementitious mixture of example 2. Table 4 shows the increase of the surface temperature over time, under DC and AC current.

TABLE 4

| | Time (min) | | | | | |
|---|---|---|---|---|---|---|
| | 0 | 10 | 20 | 30 | 40 | 50 |
| 24 V DC Sample resistance: 30.3 Ω Indoor temperature: 22.9 | | | | | | |
| Temperature (° C.) | 22.9 | 26.7 | 28.4 | 29.8 | 30.2 | 31.5 |
| 24 V AC Sample resistance: 30.3 Ω Indoor temperature: 22.8 | | | | | | |
| Temperature (° C.) | 22.8 | 28.4 | 31.8 | 32.8 | 34.3 | 36.0 |

Example 5

To simulate the use of the binder according to the invention for an indoor heating floor, a square tile of 20 cm side length consisting of six stacked layers was prepared. In sequence, from the bottom to the top, the layers were:
  a. basic support slab, thickness 2.5 cm;
  b. expanded polystyrene as thermal insulator, thickness 1 cm;
  c. typical mortar for floor undercoats, thickness 1 cm
  d. layer from the cementitious mixture of example 1, thickness 0.4 cm;
  e. cement-based glue, thickness 0.5 cm
  f. ceramic tile, thickness 0.6 cm.

A 24 V extra-low voltage was applied to the two copper electrodes embedded during casting of the fresh material in the layer (d) of the conductive cementitious part. Table 5 shows the increase of the surface temperature over time, under DC and AC current respectively.

TABLE 5

| | Time (min) | | | | | |
|---|---|---|---|---|---|---|
| | 0 | 10 | 20 | 30 | 40 | 50 |
| 24 V DC Indoor temperature: 21.5 | | | | | | |
| Temperature (° C.) | 21.5 | 24.2 | 28.5 | 31.2 | 33.0 | 35.0 |
| 24 V AC Indoor temperature: | | | | | | |
| Temperature (° C.) | 22.6 | 29.2 | 36.6 | 41.5 | 47.5 | 50.5 |

The examples prove that the binder according to the invention allows to make cementitious building parts with adequate resistivity for heating using extra-low voltage. At the same time, their mechanical properties are according to the standard UNI 11493 "Piastrellature ceramiche a pavimento e a parete—Istruzioni per la progettazione, l'installazione e la manutenzione".

What is claimed is:
1. An electrically conductive binder comprising a cement, graphite particles with a carbon content higher than 60%, and graphene,
  wherein the amount of cement ranges from 40 to 80% by mass of the binder,
  the amount of graphite particles ranges from 19.5 to 60% by mass of the binder,
  the amount of graphene, calculated as dry substance, ranges from 0.005 to 0.5% by mass of the binder and the binder contains a sterically stabilizing superplasticizer in an amount, calculated as dry substance, from 0.2 to 2.0% by mass relative to the mass of the cement, and a rheology modifier in an amount, calculated as dry substance, from 0.01 to 0.9% by mass relative to the mass of the cement.

2. The binder according to claim 1 comprising 45 to 70% by mass cement with respect to the total binder mass.

3. The binder according to claim 1, wherein the amount of graphite particles ranges from 25 to 50% by mass with respect to the binder.

4. The binder according to claim 1, wherein the amount of graphene, calculated as dry substance, ranges from 0.1 to 0.4% by mass with respect binder.

5. The binder according to claim 1, wherein the amount, calculated as dry substance, of the sterically stabilizing superplasticizer ranges from 0.5 to 1% by mass relative to the mass of cement.

6. The binder according to claim 1, wherein the amount, calculated as dry substance, of the rheology modifier ranges from 0.03 to 0.6% by mass relative to the mass of cement.

7. The binder according to claim 1, wherein the cement is CEM 152.58 with BET specific area of 1.1 to 2.5 $m^2/g$.

8. The binder according to claim 1, wherein the graphite has more than 80% by mass carbon.

9. The binder according to claim 1, wherein the graphite is natural flake graphite with cumulative mass through sieve 150 mesh higher than 80%.

10. The binder according to claim 1, wherein the graphene is graphite nanoplatelets with flake thickness around 10 nm and specific surface area higher than 30 $m^2/g$.

11. The binder according to claim 1, additionally containing an expansive mineral agent and/or a defoamer.

12. The binder according to claim 11, containing relative to the mass of cement: 0.5 to 9% by mass of expansive mineral agent, and/or 0.02 to 0.30% by mass of defoamer.

13. The binder according to claim 1, additionally containing metal fibers.

14. The binder according to claim 13, wherein the metal fibers are steel fibers having an aspect ratio between 50 and 80.

15. The binder according to claim 13, wherein the metal fibers are contained in an amount from 2 to 12% by mass relative to the mass of binder.

16. The binder according to claim 1, additionally containing one or more of pigments, polymers, fillers, and/or silica fume.

17. The binder according to claim 1 comprising with respect to the total binder mass 50 to 65% by mass cement, 30 to 40% by mass graphite particles, and 0.2 to 0.3% by mass grapheme, calculated as dry substance.

18. The binder according to claim 17, wherein the amount, calculated as dry substance, of the sterically stabilizing superplasticizer ranges from 0.5 to 1% by mass relative to the mass of cement.

19. The binder according to claim 17, wherein the amount, calculated as dry substance, of the rheology modifier ranges from 0.03 to 0.6% by mass relative to the mass of cement.

20. The binder according to claim 18, wherein the amount, calculated as dry substance, of the rheology modifier ranges from 0.03 to 0.6% by mass relative to the mass of cement.

21. The binder according to claim 20, wherein the cement is CEM 152.51 with BET specific area of 1.1 to 2.5 $m^2/g$.

22. The binder according to claim 17, wherein the graphite has more than 90% by mass carbon and is natural flake graphite with cumulative mass through sieve 100 mesh higher than 80%.

23. The binder according to claim 20, wherein the graphite has more than 90% by mass carbon and is natural flake graphite with cumulative mass through sieve 100 mesh higher than 80%.

24. The binder according to claim 17, wherein the graphene is graphite nanoplatelets with flake thickness around 10 nm and specific surface area higher than 30 $m^2/g$.

25. The binder according to claim 20, wherein the graphene is graphite nanoplatelets with flake thickness around 10 nm and specific surface area higher than 30 $m^2/g$.

26. The binder according to claim 23, wherein the graphene is graphite nanoplatelets with flake thickness around 10 nm and specific surface area higher than 30 $m^2/g$.

27. The binder according to claim 17, additionally containing an expansive mineral agent and/or a defoamer.

28. The binder according to claim 17, additionally containing steel fibers having an aspect ratio between 50 and 80 in an amount from 2 to 12% by mass relative to the mass of binder.

29. A cementitious mixture comprising an electrically conductive binder comprising a cement in an amount from 40 to 80% by mass of the binder, graphite particles with a carbon content higher than 60% in an amount from 19.5 to 60% by mass of the binder, graphene in an amount, calculated as dry substance, from 0.005 to 0.5% by mass of the binder, a sterically stabilizing superplasticizer in an amount, calculated as dry substance, from 0.2 to 2.0% by mass relative to the mass of the cement, and a rheology modifier in an amount, calculated as dry substance, from 0.01 to 0.9% by mass relative to the mass of the cement, and water, wherein the water/cement ratio ranges from 0.8 to 1.5 and/or the water/solids ratio ranges from 0.48 to 0.65.

30. The cementitious mixture according to claim 29, wherein the binder comprises with respect to the total binder mass 50 to 65% by mass cement, 30 to 40% by mass graphite, and 0.2 to 0.3% by mass grapheme, calculated as dry substance.

31. The cementitious mixture according to claim 30, wherein the cementitious mixture or the cementitious part made from it has one or more of the following properties:

spread measured according to UNI 7044 from 170 to 230 mm;

density measured according to UNI EN 1015-4 from 1600 to 1800 $kg/m^3$, and/or a 28 days hardened cementitious part from the cementitious mixture has one or more of the following properties:

a compressive strength measured according to UNI EN 196-1 from 10 to 20 MPa;

a flexural strength measured according to UNI EN 196-1 from 2.5 to 8 MPa, a dry shrinkage measured according to UNI 6687 (modified by using specimens of 1 cm thickness) from 1200 to 3000 μm/mm, an electrical resistance measured by a multimeter connected to two copper strips embedded in the cementitious part along the length from 5 to 100Ω;

an electrical resistivity calculated from the resistance ranging from 0.1 to 0.5 Ω·m.

32. A floor with underfloor heating system, wherein the floor comprises:

a basic support layer,
a layer of thermal insulating material,
a layer of concrete for floor undercoat,
a layer made from an electrically conductive binder according to claim 1 with electrical connection to an extra-low voltage AC or DC source,
an uppermost layer from ceramic or marble tiles, parquet, carpet, or laminate flooring.

33. The floor according to claim 32, wherein the floor is assembled from precast and prefabricated slabs.

34. The floor according to claim 32, wherein the binder comprises with respect to the total binder mass 50 to 65% by mass cement, 30 to 40% by mass graphite, and 0.2 to 0.3% by mass grapheme, calculated as dry substance.

35. The cementitious mixture according to claim 29, wherein the cementitious mixture or the cementitious part made from it has one or more of the following properties:

spread measured according to UNI 7044 from 180 to 220 mm;
density measured according to UNI EN 1015-4 from 1630 to 1750 kg/m$^3$;
and/or a 28 days hardened cementitious part from the cementitious mixture has one or more of the following properties:
a compressive strength measured according to UNI EN 196-1 from 13 to 17 MPa;
a flexural strength measured according to UNI EN 196-1 from 3 to 6 MPa;
a dry shrinkage measured according to UNI 6687 (modified by using specimens of 1 cm thickness) from 1600 to 2500 μm/mm;
an electrical resistance measured by a multimeter connected to two copper strips embedded in the cementitious part along the length from 20 to 60Ω;
an electrical resistivity calculated from the resistance ranging from 0.2 to 0.3 Ω·m.

\* \* \* \* \*